A. REDDING.
HOE.
APPLICATION FILED JAN. 8, 1912.
1,034,834.
Patented Aug. 6, 1912.
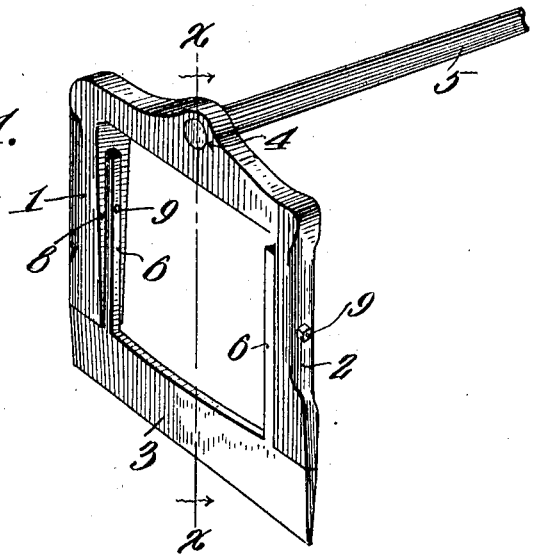
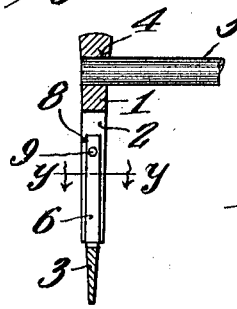
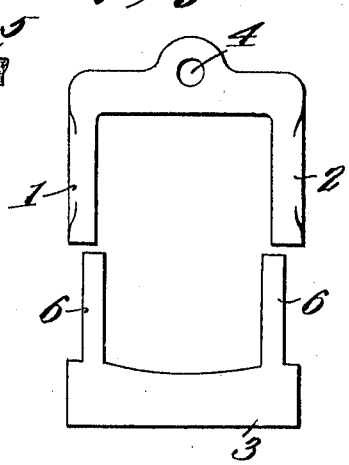
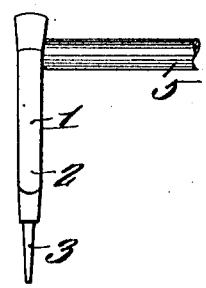
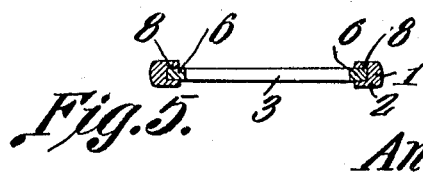
Witnesses
Anderson Redding,
Inventor
by C. A. Snow & Co.
Attorneys.

UNITED STATES PATENT OFFICE.

ANDERSON REDDING, OF JULIETTE, GEORGIA.

HOE.

1,034,834.  Specification of Letters Patent.  Patented Aug. 6, 1912.

Application filed January 8, 1912. Serial No. 670,002.

*To all whom it may concern:*

Be it known that I, ANDERSON REDDING, a citizen of the United States, residing at Juliette, in the county of Monroe and State of Georgia, have invented new and useful Improvements in Hoes, of which the following is a specification.

This invention relates to improvements in hoes, particularly for agricultural or garden purposes.

The invention has for its object to render the hoe light and yet effective, and to provide against the same becoming clogged or encumbered with adhering soil or earth.

A further object is to provide for readily renewing the blade when such becomes necessary.

A still further object is to carry out the aforesaid ends in a simple, inexpensive or economical, and expeditious manner.

The invention consists of certain instrumentalities and features substantially as hereinafter fully disclosed and defined by the appended claim.

In the accompanying drawing illustrating the preferred embodiment of my invention wherein it will be understood that various changes and modifications may be made as relate to the detailed construction and arrangement of the parts without departing from the spirit thereof, Figure 1 is a perspective view of the implement. Fig. 2 is a front elevational view thereof, with the members of the hoe proper disassociated. Fig. 3 is a section taken on the line *x—x* of Fig. 1. Fig. 4 is an edge elevation, and Fig. 5 is a section taken on the line *y—y* of Fig. 3.

In carrying out my invention, I suitably produce or form the hoe proper 1, namely, the metal-portion, of two members 2 and 3, the member 3 being the blade, the upper member 2, which is preferably U-like in outline, being provided with the usual eye 4 to receive the handle 5. The upper skeleton or U-like portion or member 2, so made to render it light and to leave the minimum surface for the adherence of the soil or earth thereto in using the hoe, receives between the lateral downwardly extending portions thereof, upstanding arms or extensions 6 of the blade-member 3, to provide for the ready renewal of the latter when it has become worn to ineffectiveness, or, as it is stated off hand, "worn-out". The downwardly extending arms of the skeleton or U-like shank-member are provided with longitudinal grooves or channels 8 in their inner surfaces to receive the upwardly extending portions or arms 6 of the blade-member 3 and, in order to hold the same assembled suitably or detachably in position for the ready renewal of the blade-member, screws 9 are inserted thereinto, as shown in Figs. 1 and 3.

In cultivating, or hoeing around small plants, especially cotton, at a certain stage, my implement or hoe is found especially useful and convenient.

What is claimed is:

An implement of the type described, including a handle-equipped member of U-like outline, the arms of which are provided in their inner surfaces with longitudinal grooves, a blade member having upstanding arms received within said grooves, and fastening means between said parts.

In testimony that I claim the foregoing as my own, I have hereto affixed my signature in the presence of two witnesses.

ANDERSON REDDING.

Witnesses:
KING MORRISON,
A. A. DAVIS.

Copies of this patent may be obtained for five cents each, by addressing the "Commissioner of Patents, Washington, D. C."